(12) United States Patent
Hsieh

(10) Patent No.: US 7,116,616 B2
(45) Date of Patent: Oct. 3, 2006

(54) METHOD FOR CONTROLLING AN OPTICAL DRIVE TO RECORD DATA

(75) Inventor: Hsiang-Ji Hsieh, Taipei Hsien (TW)

(73) Assignee: Media Tek Inc., Hsin-Chu (TW)

( * ) Notice: Subject to any disclaimer, the term of this patent is extended or adjusted under 35 U.S.C. 154(b) by 216 days.

(21) Appl. No.: 10/249,080

(22) Filed: Mar. 14, 2003

(65) Prior Publication Data

US 2004/0001412 A1    Jan. 1, 2004

(30) Foreign Application Priority Data

Jun. 27, 2002    (TW) ............................... 91114222 A

(51) Int. Cl.
*G11B 7/0045*    (2006.01)

(52) U.S. Cl. .................. 369/47.51; 369/116; 369/47.28

(58) Field of Classification Search ............. 369/59.11, 369/53.3, 53.29, 47.52, 59.12, 116, 112.02, 369/47.28, 53.34, 47.51
See application file for complete search history.

(56) References Cited

U.S. PATENT DOCUMENTS

| | | | |
|---|---|---|---|
| 5,559,785 A * | 9/1996 | Honda et al. ............. 369/59.12 |
| 6,442,115 B1 * | 8/2002 | Shimoda et al. .......... 369/47.28 |
| 6,480,454 B1 * | 11/2002 | Wada et al. ............ 369/112.02 |
| 6,504,806 B1 * | 1/2003 | Nakajo ..................... 369/59.12 |
| 6,628,595 B1 * | 9/2003 | Sasa et al. ................ 369/59.12 |
| 6,704,269 B1 * | 3/2004 | Ogawa ........................ 369/116 |
| 6,711,107 B1 * | 3/2004 | Chao et al. .............. 369/47.52 |
| 6,944,106 B1 * | 9/2005 | Suzuki ..................... 369/47.53 |
| 2001/0036136 A1 * | 11/2001 | Fukushima et al. ...... 369/53.18 |
| 2001/0043527 A1 | 11/2001 | Yoshida |
| 2002/0110059 A1 * | 8/2002 | Usui et al. ................ 369/47.28 |
| 2002/0114234 A1 | 8/2002 | Chao et al. |

FOREIGN PATENT DOCUMENTS

JP    2000-285464    10/2000

\* cited by examiner

*Primary Examiner*—Thang V. Tran
*Assistant Examiner*—Michael V. Battaglia
(74) *Attorney, Agent, or Firm*—Winston Hsu

(57) ABSTRACT

A method for controlling an optical drive to record data onto a disc. The optical recorder has a pick up head for emitting laser onto the disc to record data onto the disc. The method includes adjusting a write power and a write strategy of the optical drive according to a linear velocity of the disc when passing by the pick up head.

8 Claims, 12 Drawing Sheets

METHOD FOR CONTROLLING AN OPTICAL DRIVE TO RECORD DATA

BACKGROUND OF INVENTION

1. Field of the Invention

The present invention relates to a method of controlling an optical drive to write data, more specifically, a method of adjusting a write-in strategy and a write-in power according to a linear velocity of an optical disc operating on the optical drive.

2. Description of the Prior Art

With the rapid development of computer technology, most data can be transformed into digital form for convenience of transmitting and storing.

In order to help users store data more conveniently, various data storage devices, such as CD recorders, are being introduced. A CD-R drive, due to a low price, small volume, and large capacity of a disc, can record data onto the CD, letting the user store data more easily.

The conventional CD-R drive rotates at a zone constant linear velocity (ZCLV). When a pickup head of the CD-R drive is passing through different zones of a disc, for keeping a constant linear velocity, the angular velocity of the operating CD-R drive also changes so as to accurately record the data on the disc. In addition, a fixed-angular-velocity-operated CD-R drive does not need to frequently adjust the motor turns, and has also become a widely used drive in recent years.

Please refer to FIG. 1, which shows a schematic diagram of the CD-R drive 10 recording data onto an optical disc 20. The disc 20 has a spiral track 22 covered by a photoresist layer from the center outward. The drive 10 comprises a pickup head 12. While the drive 10 writes data onto the disc 20, the pickup head 12 makes the photoresist layer of the track 22 on the disc 20 be intermittently exposed to an on-and-off laser according to the data. The exposed photoresist layer of the track 22 will cause pits to form. On the contrary, the unexposed photoresist layer will be kept as lands. Reflections of the pits and the lands are not similar, in this way, the different data (for example, the digital "0" or "1") can be represented by the pits and the lands respectively, and stored in the disc 20. While reading the data stored in the disc 20, the drive 10 can receives reflecting laser from the disc 20 to read the data stored in the disc 20.

The extended length of the pit and the land represent the times of the particular repetition bit in disc 20, a length for continuing representative data. For example, if the pit represents bit "1", the three repetition bits "1 1 1" is represented by longer extended pits. As above-mentioned, when the disc 20 passes through the pickup head 12, the pickup head 12 will apply energy onto the disc 20 with a laser so as to write data onto the disc 20. Both the applied energy (that is, the laser power) and the applied time of the energy can affect the extended length of the pits and further affect the precision of the written data on the disc 20.

Please refer to FIG. 2, which shows a relation plot of an amount of exposure of the photoresist layer against the fragment position relative to the pickup head 12 while the disc 20 is rotating. When the drive 10 is going to write data into the disc 20, the pickup head 12 begins to emit a laser while passing through the fragment of p0. At this moment, the received energy of the disc 20 is not enough to form a pit. As the disc 20 is rotating, the pickup head 12 constantly supplies energy onto the disc 20. While the fragment of p1 is passing through the pickup head 12, a temperature of the photoresist layer of the fragment reaches a threshold temperature Eth and a pit is formed. While passing through the fragment of p2, the pickup head 12 stops emitting a laser and the temperature of the disc 20 decreases gradually. While the pickup head 12 is passing through the p3, the temperature of the photoresist layer is lower than threshold temperature Eth and a pit is no longer formed. In other words, a real extended length of the pit is from position p1 to p3. From FIG. 2, a length from p0 to p1 is obviously different from a length from p2 to p3, that is, if a pit intends to be formed from p1 to p3, the pickup head 12 of the drive 10 must begin/stop emitting a laser while passing through the position p0 and p2 respectively. In addition, the energy applied from the pickup head 12 affects the formed pit as well. For instance, the larger energy the pickup head 12 applies to the disc 20, the closer to the initial position, where the pickup head 12 begins to apply energy, the reaching threshold temperature Eth position of the photoresist layer is. Generally speaking, while writing data into the disc 20, the drive 10 can determine a position and a length of a pit, i.e. the position of p1 and p3, according to the data. As to the position where the pickup head 12 actually applies energy, i.e. the position of p0 and p2, are determined by a specific write-in strategy along with an optimal write-in power based on the position p1 and p3. Because the data within the disc 20 has direct relation to the extended length of the pit, an over-length or an under-length of the pit is incapable of correctly recording data onto the disc 20.

Please refer to FIG. 3. FIG. 3 is an enlarged plot according to a dotted line section of the disc 20 shown in FIG. 1. For a rewritable disc 20, its track 22 can be divided into two kinds of tracks, one is a data track 26 for use to record data, and the other is a wobble track 28 for use to record relative information of each frame on the disc 20. The data track 26 is an arc along the disc 20 and around the center of the disc 20, like the track 22. Because FIG. 3 is an enlarged plot of a tiny part of the arc track, the data track 26 shown in FIG. 3 is a straight line. However, the wobble track 28 is not only an arc along the disc 20 and around the center of the disc 20, from a view of FIG. 3, but also appears as crawl-shaped with small amplitude along the track 22. The pickup head 12 of the drive 10 can receive reflected light from the wobble track 28 and forms a wobble signal. The drive 10 can detect which part of data on the disc 20 is being read by the pickup head 12 based on the wobble signal.

According to the orange book regulating the specification of the disc 20, while the emitted laser power from the pickup head 12 has optimal power, the reflected signal measured by the pickup head 12 is an AC coupled high frequency (HF) signal with a perfect symmetrical amplitude. Please refer to FIG. 4 which shows a waveform of the HF signal reflected from the disc 20 while the pickup head 12 of the drive 10 writes data onto the disc 20 based on an optimal write-in power, where the horizontal axis represents time, the vertical axis represents amplitude, and the place marked as level dc represents a corresponding amplitude of a long-term average of the waveform. If a laser is reflected from a pit, the HF signal shows an upper amplitude A1 over the level dc. If a laser is reflected from a land, the HF signal shows a lower amplitude A2 below the level dc. A measurement amplitude parameter $\beta=(A1-A2)/(A1+A2)$ is for use to compare the A1 and A2. During writing data into the disc 20, the drive 10 will encode the data, resulting in a total extended length of pits equaling to a total extended length of lands. In other words, a total spent time of the laser reflecting from pits and a total spent time of the laser reflecting from lands are the same, which causes a long-term average level dc of the reflected HF signal to be exactly in the middle of the upper amplitude A1 and the lower amplitude A2, that is β=0. If the laser power emitted from the pickup head 12 is lower than the optimal power or if the laser-emitting time is too short, either causes the insufficient extended pits, which makes the waveform of the HF signal move downward and causes A1 to be less than A2, leading to β<0. On the contrary, if the laser power emitted from the pickup head 12 is higher than the optimal power or if the laser-emitting time is too long, either forms an over-length of an extended pit, which makes the waveform of the HF signal move upward and causes A1 to be more than A2, leading to β>0. In other words, β represents an amount of the pits matching an amount of the lands during encoding. When β does not equal to 0, it means either the length of the pit or that of the land is incorrect, resulting in errors during encoding. Besides β, a signal jitter in the duration of data-reading also can be used to judge a correction of data-writing. If there is something wrong when the disc 20 is written, even identical bits, the last time of signal-reading (that is, the extended length of the pits or the lands), are not the same, which increases the signal jitter.

Please again refer to FIG. 1. The drive 10 further includes an absolute time in pregroove decoder (ATIP decoder) 14 for decoding the absolute time code acquired from pickup head 12 and an eight-to fourteen modulator (EFM) 16 for modulating the data into EFM data. The drive 10 includes a table 18, which shows write-in strategies corresponding to write-in powers. The drive 10 adjusts the write-in strategy and the write-in power based on both a time code and the table 18. The drive 10 can be a constant-angular-velocity-operated drive. While the drive 10 rotates the disc 20, the rotation angular velocity of the drive 10 stays constant. Due to the fixed angular velocity of the drive 10, when the drive 10 is operating, a linear velocity of an inner orbit of the disc 20 is smaller, but a linear velocity of an outer orbit of the disc 20 is larger. If intending to write data into the inner orbit of the disc 20, due to a smaller linear velocity of an inner orbit, the pickup head 12 has enough time to emit a laser exposing the photoresist layers on the inner orbits, therefore the emitted laser power from the pickup head 12 is not too large. On the other hand, if intending to write data into the outer orbit of the disc 20, due to a larger linear velocity of an outer orbit, the pickup head 12 has to augment the laser power or increase the heating time so that the photoresist layer on the outer orbit of the disc 20 can complete exposure in a predetermined time. As a result, the write-in strategy and the write-in power have to be adjusted adequately along with the process of data-writing.

Please refer to FIG. 5, FIG. 6, and FIG. 7. FIG. 5 is a schematic diagram of distribution frames along the disc 20. FIG. 6 is a relation plot showing the linear velocity of the rotating disc 20 against the record time of the drive 10 while the pickup head 10 is passing through the disc 20. FIG. 7 is a relation diagram showing the value of β against time. The track for recording data on the disc 20 can be divided into a plurality of frames, each having identical data capacity. In CD-R/CD-RW, a linear length of each frame (an arc along the track) is identical. Two frames FA and FB are marked in FIG. 5, where the inner frame FA is from Fa0 to Fa1 and the outer frame FB is from Fb0 to Fb1. In the prior art, the drive 10 adjusts the laser power emitted from the pickup head 12 according to the frames, that is, the emitted laser powers from the pickup head 12 are the same in an identical frame. The emitted laser powers from the pickup head 12 changes as a change of frames.

As a curve 50 shows in FIG. 6, while the pickup head 12 is moving from the inner part of the disc 20 outward, the linear velocity of the disc 20 skipping the pickup head 12 is increasing. On the other hand, even though the linear length of each frame is identical, the spread angle of the center of the disc 20 corresponding to the frame distributed in the inner disc 20 (like frame FA) is also larger and each point within the frame corresponding to the radius of the center of the disc 20 has a larger difference. As inner frame FA shows in FIG. 5, the radius from the center to the start point of Fa0 is different from that from the center to the end point of Fa1. Relatively, the spread angle of the center of the disc 20 corresponding to the frame FB distributed in the outer disc 20 is smaller, and the radius from the center to the point Fb0 and Fb1 are almost the same. That the radius from each point to the center has a larger difference means while the pickup head 12 passes through different points within the frame FA, the linear velocity changes more greatly. As shown in FIG. 6, where an interval between the time t0 and t1 represents the spent time of the pickup head 12 passing through the inner frame FA, an interval of the time t5 and t6 represents the spent time between the pickup head 12 passing through the outer frame FB. Despite the change of the linear velocity among different points within the inner frame of the disc 20 being larger, the write-in strategy and the write-in power are adjusted according to the frames in prior art, resulting in the same write-in strategy and the write-in power are used to write data into the inner frame. In this way, the linear velocity at the end fragment of the inner frame is faster than that at the start fragment of the inner frame during writing data into the inner frame. For the end fragment of the frame, the write-in strategy and the write-in power adapted to the start fragment of the frame can cause a lack of absorption energy, which leads to too short a length of the pits. Similarly, for the start fragment of the frame, the write-in strategy and the write-in power adapted to the end fragment of the frame can cause over-absorption energy, which leads to too long a length of the pits. From FIG. 7, while the pickup head 12 writes data into the end of the inner orbit, the absolute value of β being maximum, that is, the laser power emitted from the pickup head 12 at this moment is most far from the optimal power, meaning that the pickup head 12 is prone to generate errors at this position of the disc 20.

While writing data into the outer frame of the disc 20, owing to little linear velocity change at each position of the outer frame, the pickup head 12 is unable to make mistakes, even when writing data into a sequence of two or three frames with the same write-in strategy and the write-in power. From FIG. 7, β is approximate to 0 when the pickup head 12 writes data into the outer orbit of the disc 20. As a result, it is not necessary to store too many write-in strategies and the write-in powers in the table 18 in prior art.

In addition to the above defect, a change of the drive 10 operation speed makes the table 18 useless. For example, the table 18 adapted to the two-times drive is not suitable for the four-times drive. Even at the same frame, while the operation speed of the drive changes, the linear velocity of the pickup head passing the frame changes, and the corresponding write-in strategy and the write-in power also change. In this way, arising from a promotion of the drive operation speed, the conventional drives have to test new write-in strategies and write-in powers again, resulting in a wasted time and a cost increase of the drive development.

SUMMARY OF INVENTION

It is therefore a primary objective of the claimed invention to provide a method for recording data with a drive so as to promote an accuracy of recording data onto a disc with the drive.

Briefly summarized, the claimed invention provides a method of controlling an optical drive to write data onto an optical disc, the optical drive includes a pickup head for providing energy onto the disc. While the received energy of the disc is over a threshold, a mark for recording data is formed on the disc. During forming a mark on a data-location on the disc, the optical recorder determines when to start to provide energy based on the write-in strategy before the data-location passes through the pickup head. The method comprises adjusting the write-in strategy based on the linear velocity of the disc when the disc is passing through the pickup head.

These and other objectives of the claimed invention will no doubt become obvious to those of ordinary skill in the art after reading the following detailed description of the invention, which is illustrated in the various figures and drawings.

DETAILED DESCRIPTION

Figure 8:
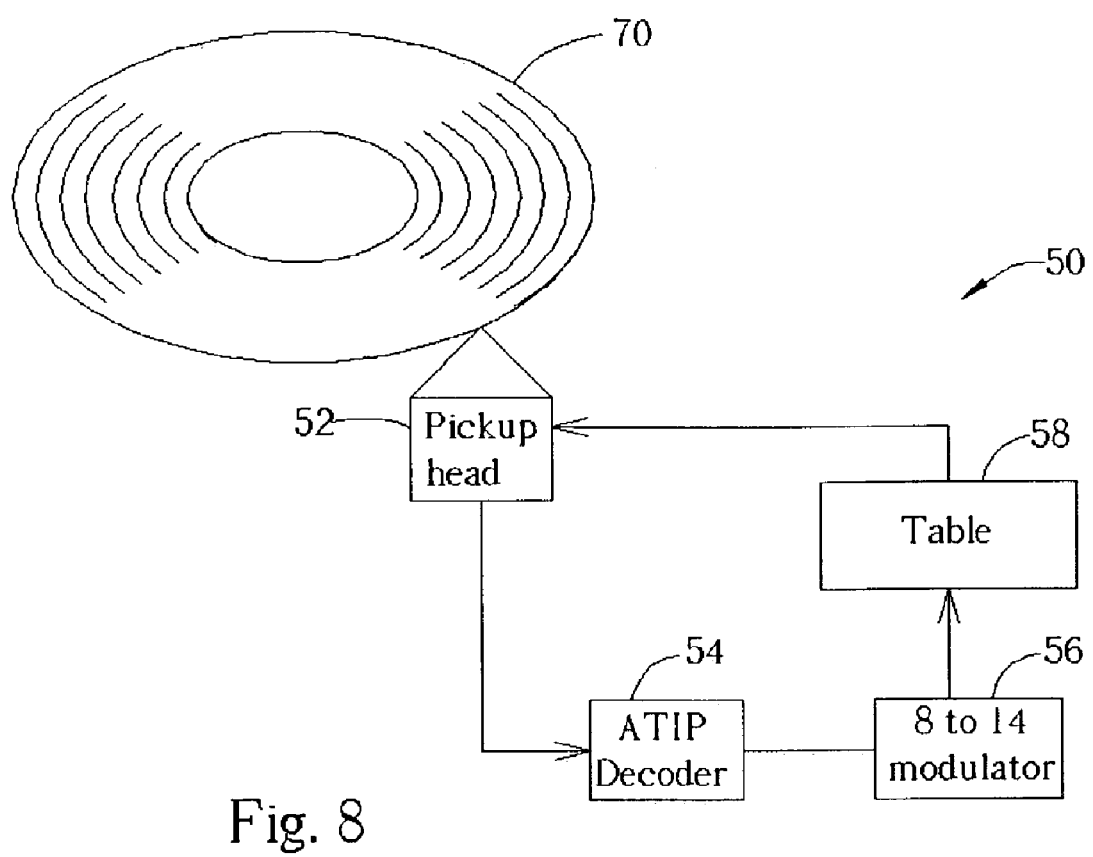
FIG. 8 shows a block diagram of the present invention.

Please refer to FIG. 8, which shows a block diagram of the drive 50 according to the present invention. The drive 50 includes a pickup head 52 for emitting a laser onto a disc 70 and for receiving the reflected laser from the disc 70 so as to read data and the wobble signal stored in the disc 70, an ATIP decoder 54 for decoding the received wobble signal from the pickup head 52 into absolute time code and measuring the frequency of wobble signal to obtain the linear velocity, an eight-to-fourteen modulator (EFM) 56 for modulating the data into EFM data, and a table 18 for storing various linear velocities against write-in strategies and write-in powers. The drive 50 can be a constant-angular-velocity-operated drive, that is, the angular velocity is a constant when the drive 50 drives the disc 70 rotating.

Figure 9:
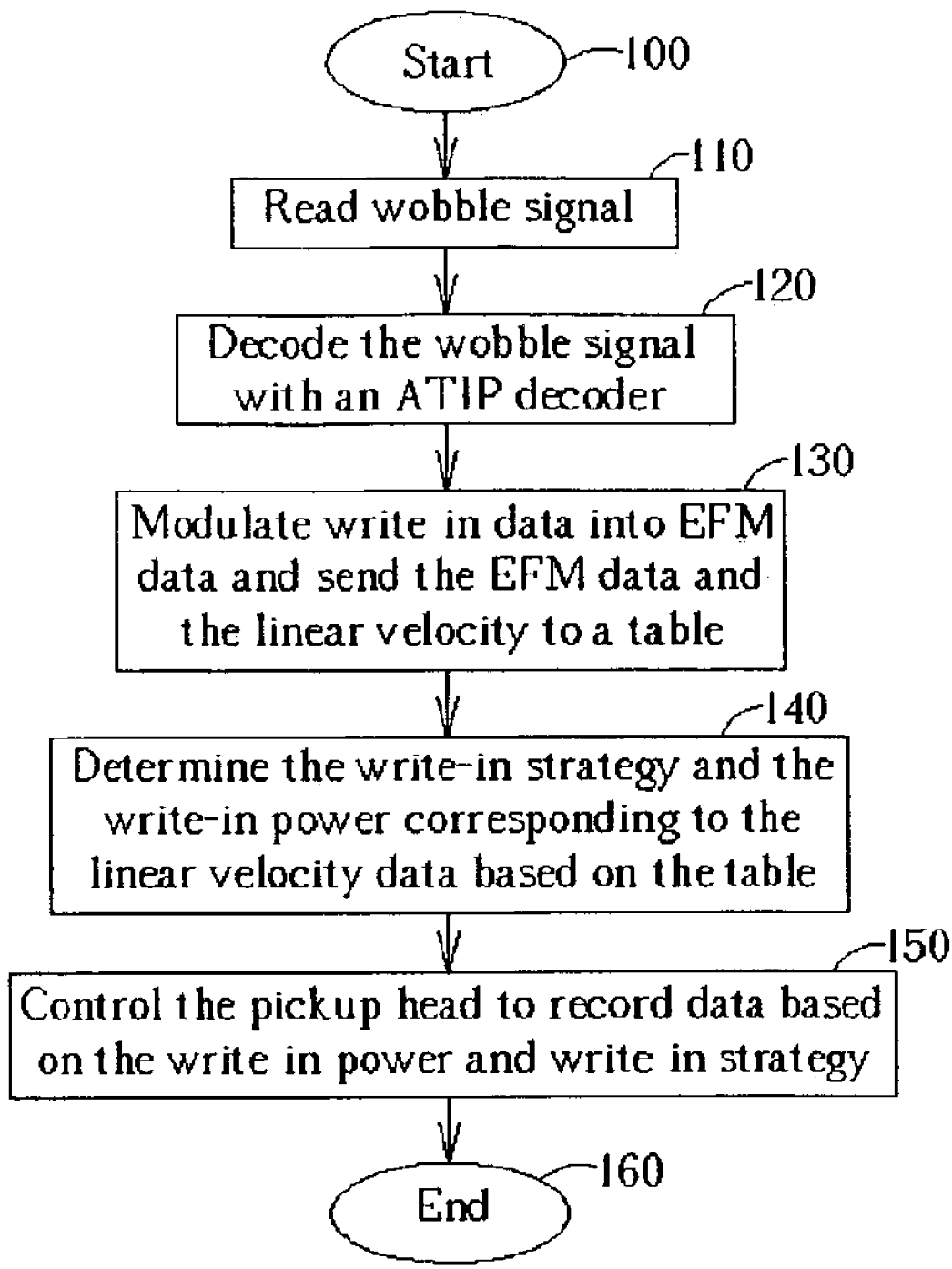
FIG. 9 is a flow chart of changing the write-in strategy and the write-in power according to the present invention.

A difference between the present invention and prior art lies in that the drive 50 finds the corresponding write-in strategy and the corresponding write-in power stored in the table 58 based on the linear velocity when the disc 70 is passing through the pickup head 52. Please refer to FIG. 9. FIG. 9 is a flow chart of changing the write-in strategy and the write-in power according to a change of the linear velocity of the disc 70 when the disc 70 is passing through the pickup head 52. The flow occurs as follows:

Step 100: Start; (at this time, the disc 70 has been placed on the drive 50)

Step 110: Read a wobble signal stored on the disc 70 with the pickup head 50, and send the wobble signal to the ATIP decoder 54;

Step 120: Decode the sent wobble signal with the ATIP decoder 54; (The ATIP decoder 54 will decode the wobble signal into absolute time code and measure the frequency of wobble signal to obtain the linear velocity)

Step 130: Modulate write data into EFM data, and send the EFM data and the linear velocity data to the table 58;

Step 140: Determine the write-in strategy and the write-in power corresponding to the linear velocity based on the table 58; (If the linear velocity data is between a first linear velocity data and a second linear velocity data both stored in the table 58, determine the write-in power and the write-in strategy with an interpolation method)

Step 150: Control the pickup head 52 based on the write-in strategy and the in power;

(In other words, the emitted laser power from the pickup head 52 is controlled by the write-in power, and the beginning and the finishing emitting times of the pickup head 52 are controlled by the write-in strategy)

Step 160: End. (At this time, the pickup head 52 has recorded data accurately in the disc 70)

In above steps, it is assumed that the linear velocity of the pickup head 52 passing through the disc 70 is V1. When the drive 50 determines a write-in power WP1 and a write-in strategy WS1 corresponding to the linear velocity V1 with an interpolation method, in the meantime, the linear velocity of the disc 70 passing through pickup head 52 is increasing to V2. If the write-in power WP1 and the write-in strategy WS1 corresponding to the linear velocity V1 continues to be used to emit laser onto the disc 70, errors occur. So the write-in power WP1 and the write-in strategy WS1 requires a predetermined weight so as to meet the optimal write-in power and optimal write-in strategy while the linear velocity of the disc 70 passing through pickup head 52 is V1.

Figure 10:
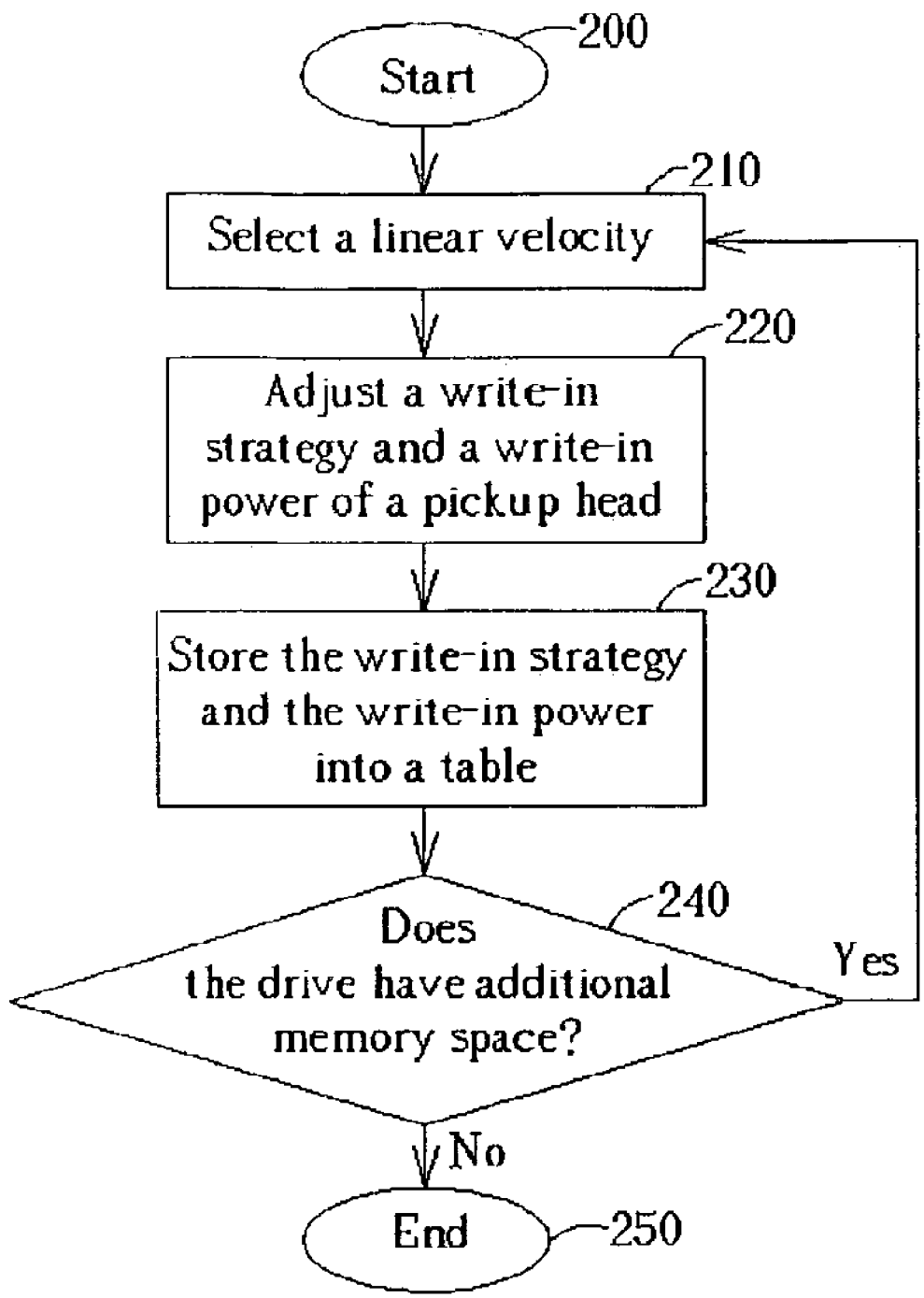
FIG. 10 is a flow chart of resetting a table according to the present invention.

The present invention also can be used for resetting the table 58. Please refer to FIG. 10. FIG. 10 is flow chart of resetting the table 58 according to the present invention, the flow occurs as follows:

Step 200: Start; (at this time, the disc 70 has been placed on the drive 50)

Step 210: Select a linear velocity; (control the drive 50 so that the disc 70 can pass through the pickup head 52 by the selected linear velocity)

Step 220: Adjust a write-in strategy and a write-in power so as to ensure both the write-in strategy and the write-in power are optimal; (that is, the value of β of the received reflected wave from the disc 70 is 0)

Step 230: Store the optimal write-in power, the write-in strategy and the linear velocity data in the table 58; (certainly, a predetermined weight also can be added into the optimal write-in power and the optimal write-in strategy and then stored in the table 58)

Step 240: Check the drive 50 to see whether the memory space is enough or not to store an additional group of a linear velocity against a write-in strategy/a write-in power, if it is, go to step 210; If not, go to step 250; (Under a circumstances of not retarding a normal operation of the drive 50, simultaneously selecting many groups of linear velocities against write-in strategies/write-in powers can efficiently promote an accuracy of the drive's 50 writing data)

Step 250: End. (at this time, the drive 50 can record data onto the disc 70 according to the table 58)

Figure 1:
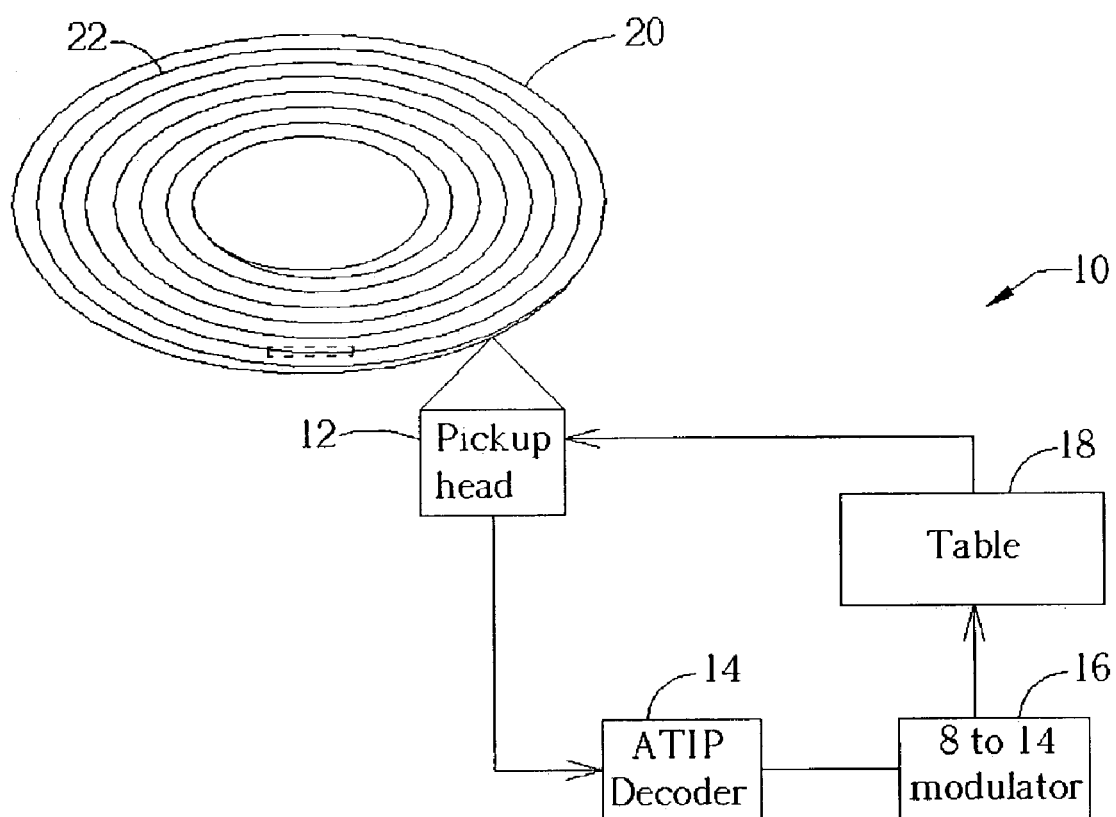
FIG. 1 is a schematic diagram of a conventional drive recording data into a rewritable disc.
Figure 2:
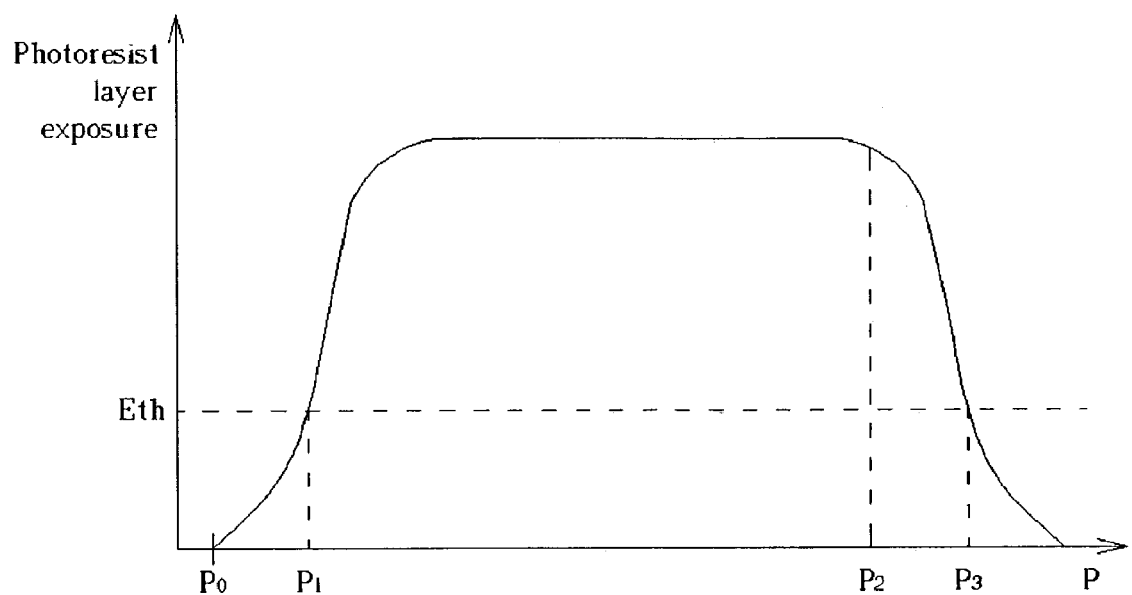
FIG. 2 shows a physical characteristic of a photoresist layer within a disc.
Figure 3:
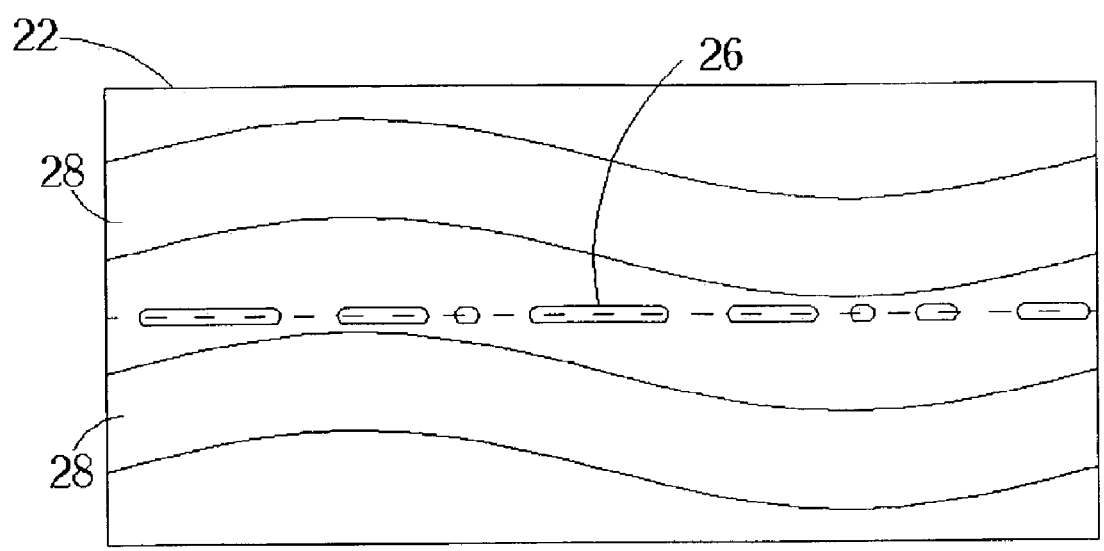
FIG. 3 is an enlarged diagram of a dotted line section of the disc shown in FIG. 1.
Figure 4:
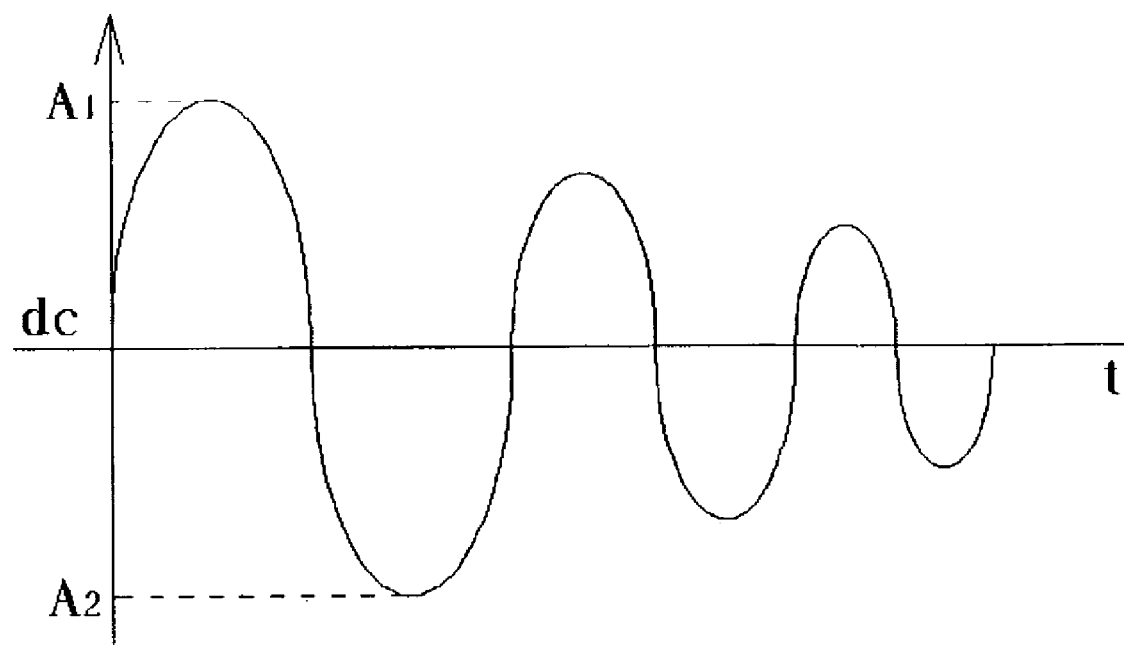
FIG. 4 shows a waveform of a high frequency signal reflecting from the disc received by a pickup head of the drive.
Figure 5:
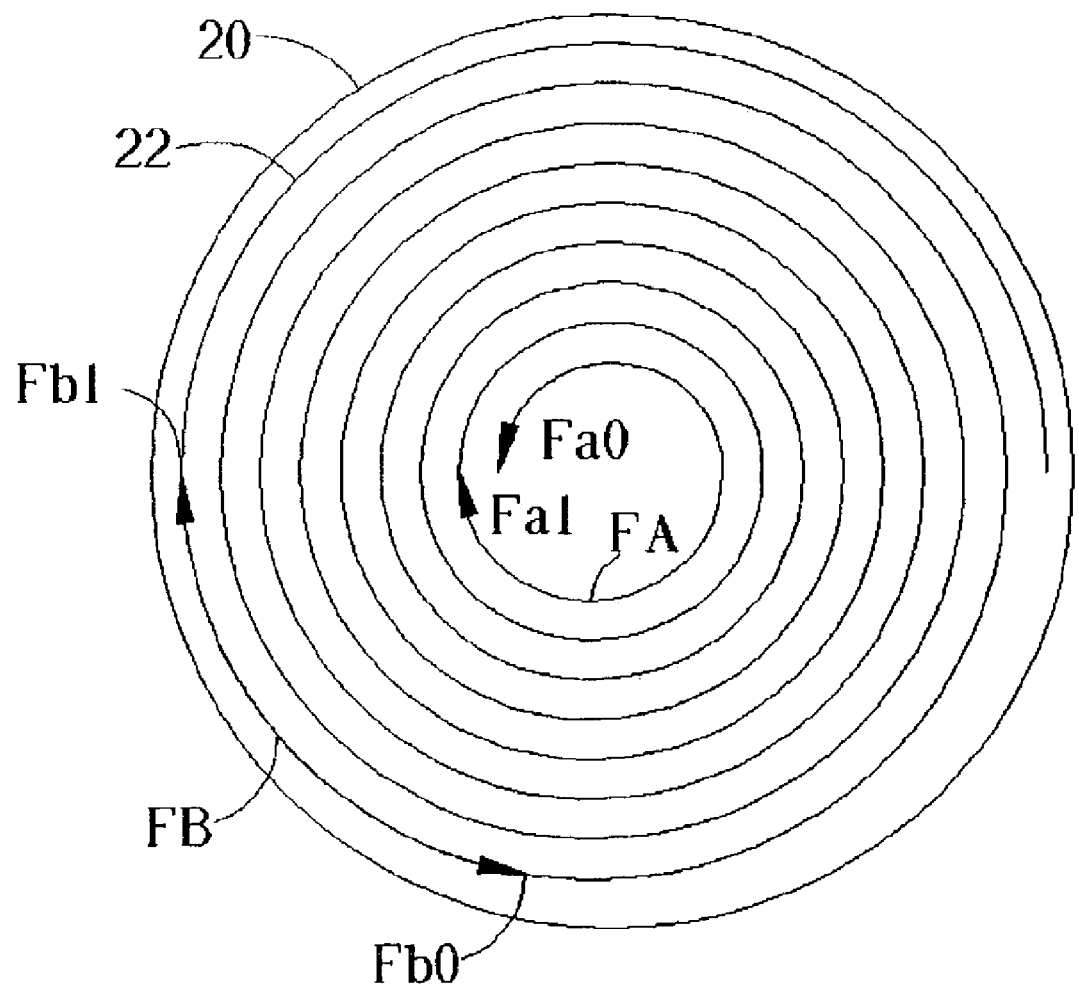
FIG. 5 shows distribution frames along a track on the disc.
Figure 6:
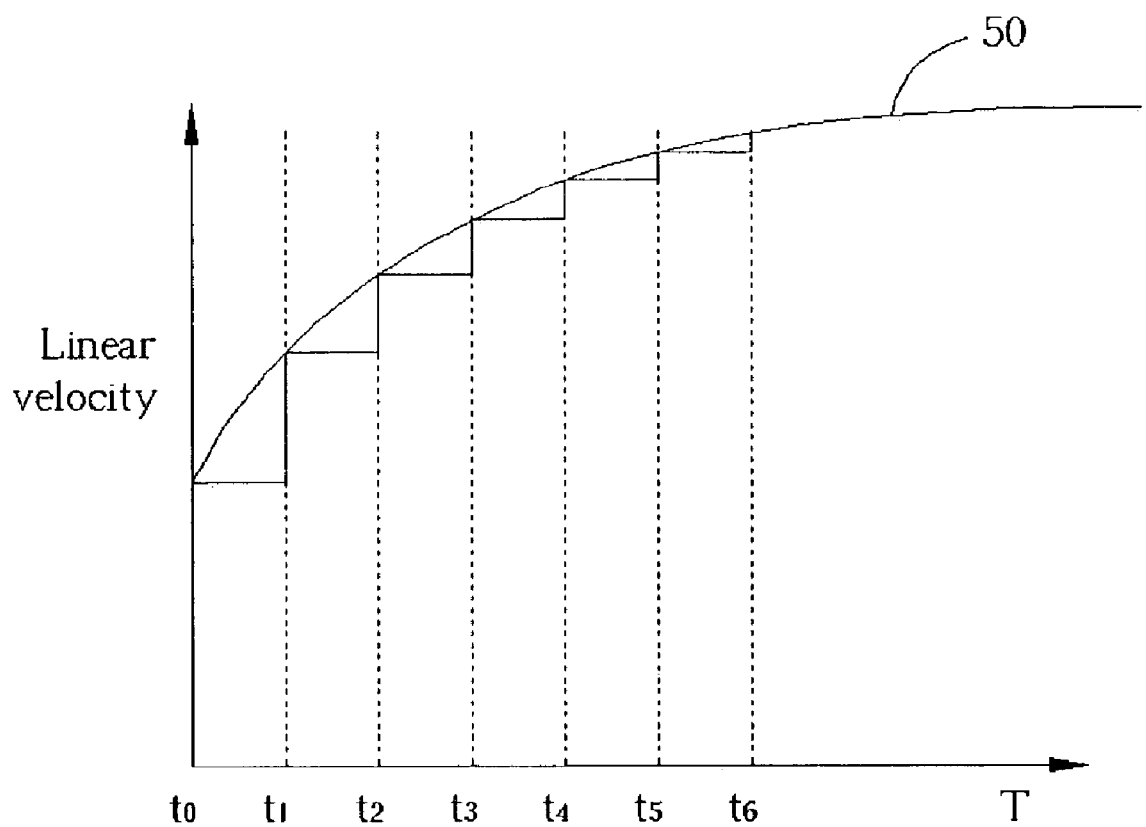
FIG. 6 shows a spent time of the conventional drive recording against the linear velocity of the pickup head passing through the disc.
Figure 7:
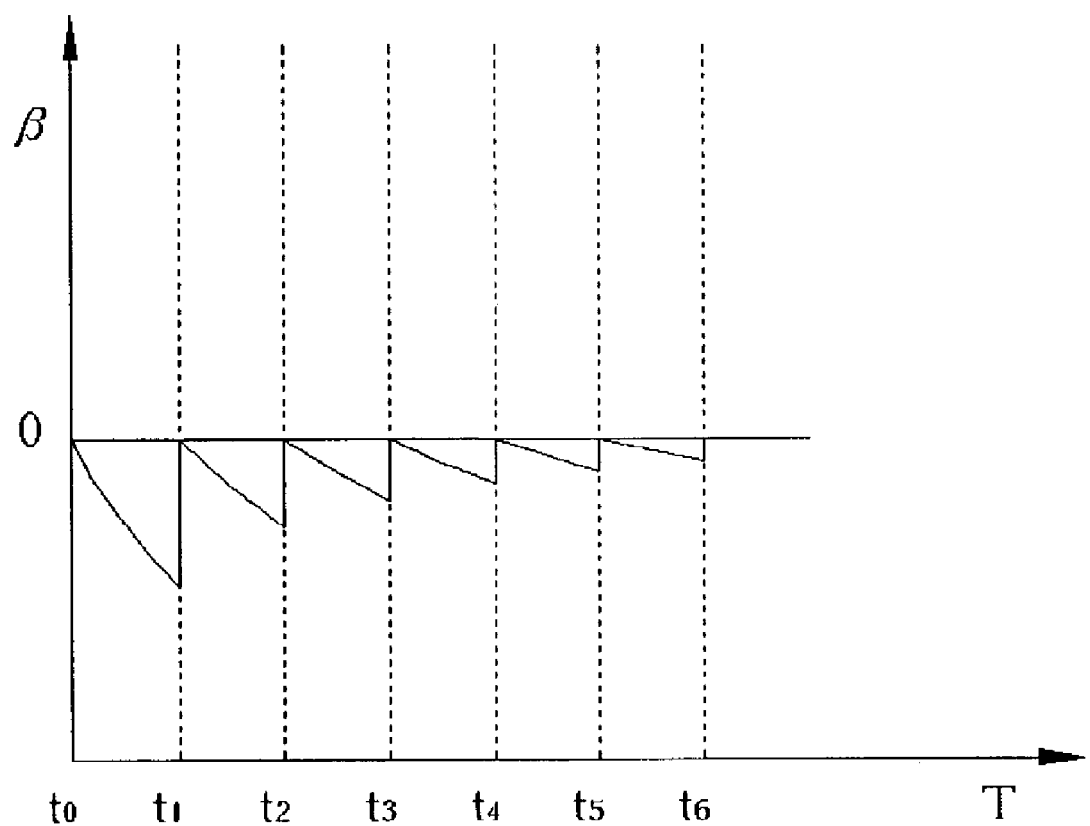
FIG. 7 shows β value of the drive against the time according to prior art.
Figure 11:
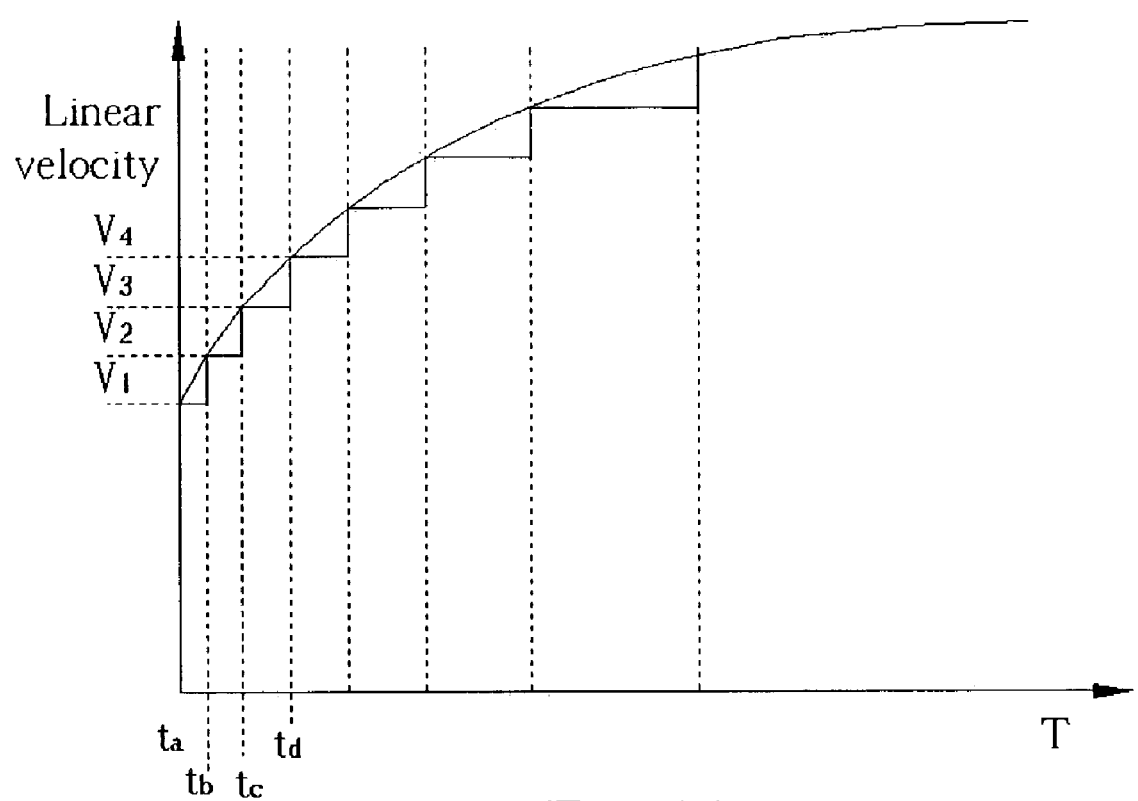
FIG. 11 shows a spent time of the drive recording against the linear velocity of the pickup head passing through the disc according to the present invention.
Figure 12:
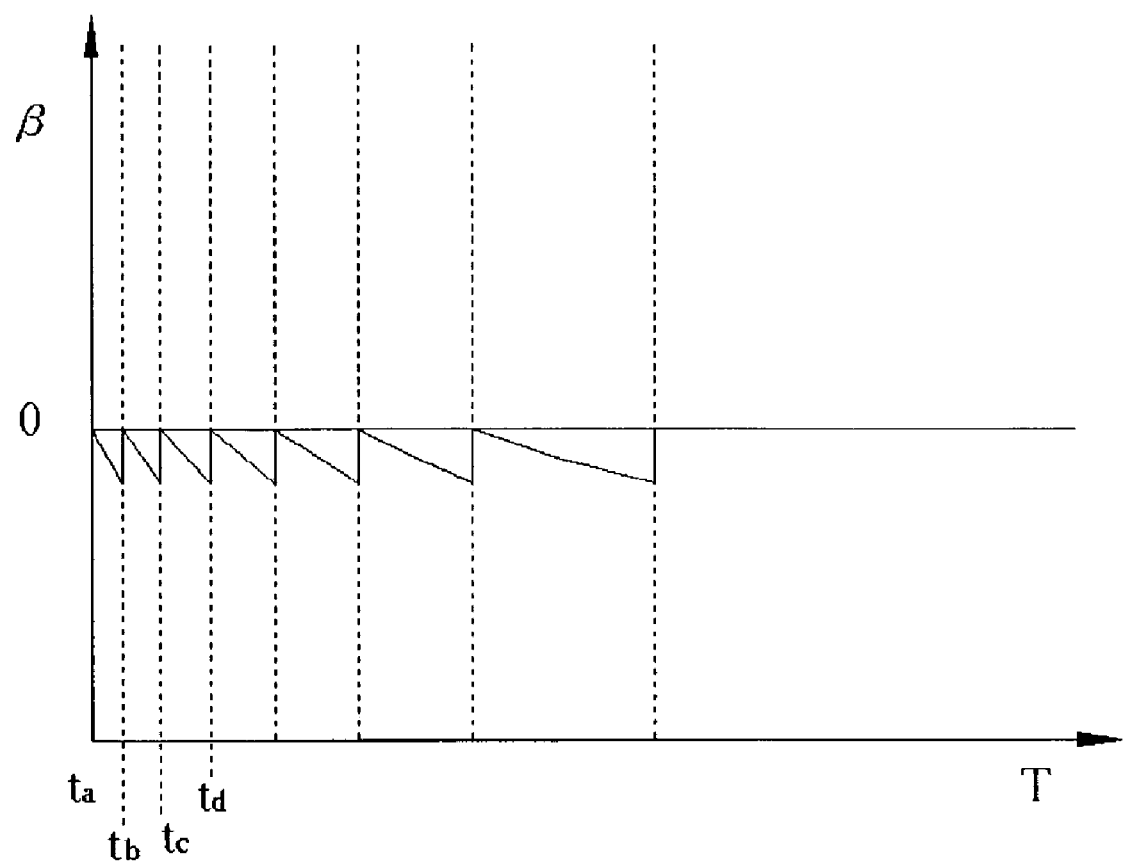
FIG. 12 shows β value of the drive against the time according to the present invention.

Please refer to FIG. 11 and FIG. 12 together (and compare with FIG. 6 and FIG. 7). FIG. 11 shows a spent time of the drive 50 recording against the linear velocity when the pickup head 52 is passing through the disc 70 according to the present invention. FIG. 12 shows β of the drive 50 against the time according to the present invention. As shown in FIG. 11, because the present method adjusts the write-in strategy and the write-in power based on the linear velocity when the disc 70 is passing through the pickup head 52. If the linear velocity is between V1 and V2, a first write-in strategy/a first write-in power can be used; if the linear velocity is between V2 and V3, a second write-in strategy/a second write-in power can be used etc. Compare to FIG. 12 and FIG. 7, β of the present method shown in FIG. 12 is more approximate to 0, in other words, the write-in strategy and the write-in power of the present method are closer to the optimal write-in strategy and the optimal write-in power than those of prior art are. From FIG. 11, while the inner frame of the disc 70 is passing through the pickup head 52, the pickup head 52, due to a greater change of the linear velocity, the write-in strategy and the write-in power are frequently adjusted to achieve better effects. While the outer frame of the disc 70 is passing through the pickup head 52, the pickup head 52, due to a smooth change of the linear velocity, need not frequently alter the write-in strategy and the write-in power. Such arrangement of the write-in strategy and the write-in power not only efficiently make use of a memory inside the drive 50, but also ensure an accuracy of data-writing. On account of various linear velocities available to different write conditions, the present method is more suitable to a constant-angular-velocity-operated drive.

While establishing the table 58 of the present invention, select a highest velocity of a high-speed drive as a benchmark, selecting a plurality of linear velocities under the highest velocity, then testing the high-speed drive by means of testing the highest velocity and the plurality of linear velocities in turn to determine a corresponding optimal write-in power and a corresponding optimal write-in strategy, and storing the highest velocity, the plurality of linear velocities, both the optimal write-in power and the optimal write-in strategy corresponding to each linear velocity to a table together. While the drive intends to record data to a disc, the drive can determine a write-in power and a write-in strategy stored in the table with an interpolation method, based on the linear velocity when the disc is passing through a pickup head of the drive, adding a predetermined weight to the write-in power and the write-in strategy, the pickup head can record data based on the weighted write-in power and the weighted write-in strategy.

In contrast to the prior art, it is an advantage of the claimed invention that the claimed invention can adjust the write-in power and the write-in strategy according to the linear velocity of the disc 70 passing through the pickup head 52. While the inner orbit of the disc 70 is passing through the pickup head 52, the drive 50 can more frequently adjust the write-in power and the write-in strategy so as to adapt to a greater change of the linear velocity. Such can promote an accuracy of recording data. In other aspects, owing to less change of linear velocity, it is not necessary to store too many groups of the write-in power and the write-in strategy. Such can save memory spaces of the drive 50. Furthermore, in present invention, while a higher-speed drive appears, the table storing the write-in power and the write-in strategy is no longer necessarily updated. This is because the present method defines the table according to the linear velocity. If an operation speed of the drive is rising, which only promote a linear velocity, the drive can determine both the write-in power and the write-in strategy corresponding to the higher linear velocity from the original table, in this way, such can reduce a cost and a spent time of a drive development.

Those skilled in the art will readily observe that numerous modifications and alterations of the method may be made while retaining the teachings of the invention. Accordingly, the above disclosure should be construed as limited only by the metes and bounds of the appended claims.

What is claimed is:

1. A method of controlling an optical drive to write data onto an optical disc, the drive comprises a pickup head for emitting a laser to write data onto the disc, the method comprising:

measuring the frequency of a wobble signal read from the disc to obtain a linear velocity of the disc;

determining a write-in power emitted from the pickup head based on the linear velocity of the disc when the disc is passing through the pickup head under constant angular velocity;

adjusting the write-in power to get an optimal write-in power data;

storing the linear velocity and the corresponding optimal write-in power data of the optical disc in a table, wherein the table is utilized for storing at least a group of write-in power data each corresponding to a linear velocity;

checking the optical drive to see whether the spaces of the table are enough or not to store an additional group of a linear velocity against a write-in power;

if the memory space is enough, proceeding to get the additional group of a linear velocity against the corresponding write-in power data; and if the memory space is not enough, not proceeding to get the additional group of a linear velocity against the corresponding write-in power data.

2. The method of claim 1, wherein if the linear velocity of the disc passing through the pickup head is between a first linear velocity and a second linear velocity, determining a laser-power emitting from the pickup head, between the write-in power data corresponding to the first linear velocity and the second linear velocity, with a predetermined algorithm.

3. The method of claim 2, wherein the predetermined algorithm is an interpolation method.

4. The method of claim 1, wherein the quality of the data written on the disc is judged by a value of β, and the optimal write-in power is obtained when the value of β is a predetermined value.

5. A method of controlling an optical drive to write data onto an optical disc, the optical drive comprises a pickup head for providing energy onto the disc; while the received energy of the disc is over a threshold, a mark for recording data is formed on the disc; during forming a mark on a data-location on the disc, the optical drive determines when to start to provide energy based on the write-in strategy before the data-location passes through the pickup head; the method comprising:

measuring the frequency of a wobble signal read from the disc to obtain a linear velocity of the disc;

determining the write-in strategy based on the linear velocity of the disc when the disc is passing through the pickup head under constant angular velocity;

adjusting the write-in strategy to get an optimal write-in strategy data;

storing the linear velocity and the corresponding optimal write-in strategy data for the optical disc in a table, wherein the table is utilized for storing at least a group of write-in strategy data each corresponding to a linear velocity;

checking whether the spaces of the table are enough to store an additional group of a linear velocity against a write-in strategy or not;

if the memory space is enough, proceeding to get the additional group of the linear velocity against the corresponding write-in strategy data; and if the memory space is not enough, not proceeding to get the additional group of a linear velocity against the corresponding write-in power data.

6. The method of claim 5, wherein if the linear velocity of the disc passing through the pickup head is between a first linear velocity and a second linear velocity, determining a write-in strategy of the pickup head, between the write-in strategy data corresponding to the first velocity and the second linear velocity, with a predetermined algorithm.

7. The method of claim 6, wherein the predetermined algorithm is an interpolation method.

8. The method of claim 5, wherein the quality of the data written on the disc is judged by a value of $\beta$, and the optimal write-in strategy is obtained when the value of $\beta$ is a predetermined value.

* * * * *